July 15, 1958     E. C. HELLWIG     2,842,863
ALINING GUIDES FOR PIPE BENDING
Filed April 20, 1954
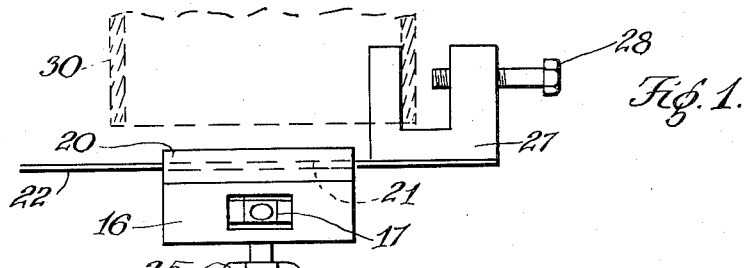
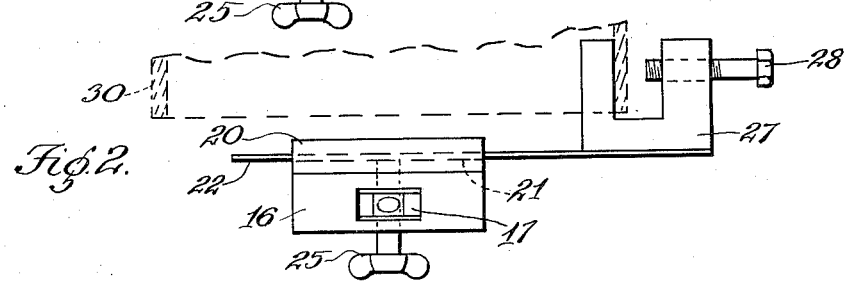
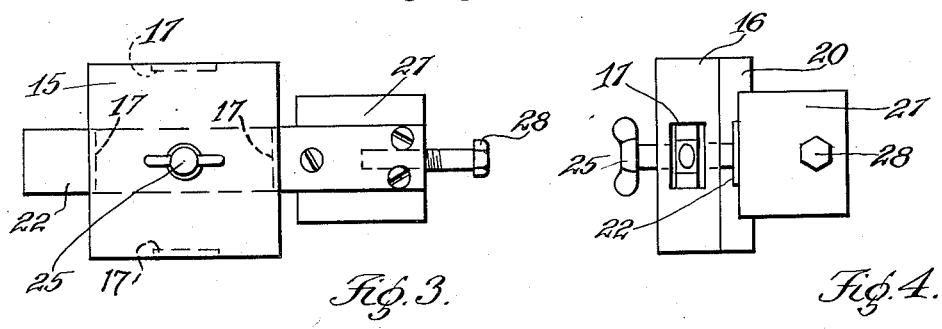
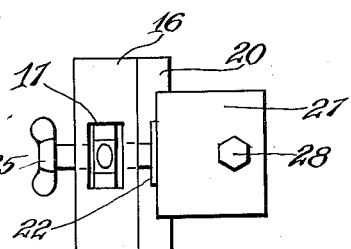
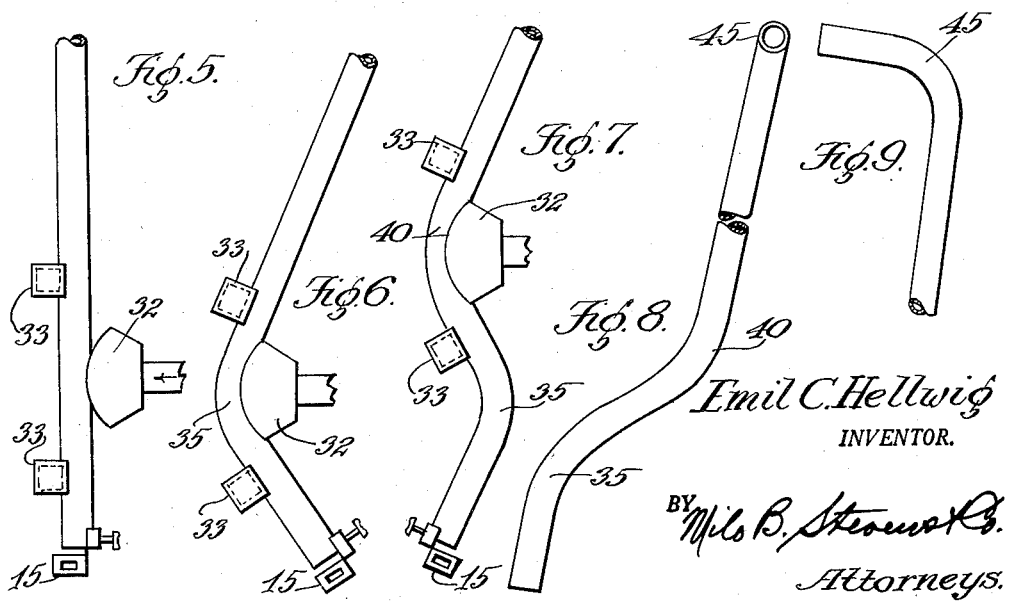
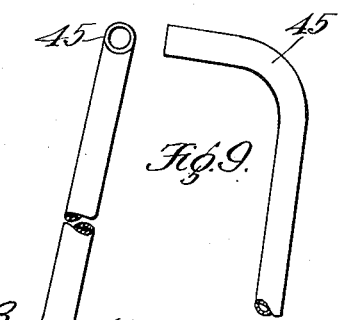
Emil C. Hellwig
INVENTOR.

2,842,863
ALINING GUIDES FOR PIPE BENDING

Emil C. Hellwig, Burlington, Iowa

Application April 20, 1954, Serial No. 424,447

2 Claims. (Cl. 33—207)

My invention relates to the bending of pipes, such as for rails or conduits, in which the pipe is required to take an offset or jog in one place or another, or a side bend. Work of this kind is done in a bending device or machine, but accuracy in the alinement of bends often is a speculative factor. Thus, the first bend does not requirement alinement, but if the next bend is in the opposite direction, there always is the question whether it will not veer off sidewise to some extent to a wrong angle or what is commonly called a dog leg. Also, in making a side bend after an offset is made in the pipe as stated, it is possible that the pipe again veers off somewhat from the right plane. These conditions occur because it is hardly possible to set the pipe manually with such accuracy after the first bend has been made that the resulting bends will be precisely in the proper planes, and it is therefore one object of the present invention to provide an alining guide for use preparatory to forming the pipe bends, such guide having means for leveling the pipe.

A further object is to include means in the guide for leveling the pipe for a bend made at right angles to the plane of the offset bends.

Another object is to design the guide in the form of a small unit which is easily attachable to one end of the pipe, and as easily removable when the bends in the pipe have been formed.

An additional object is to include in the guide an adjusting device to center the guide opposite the end of the pipe.

An important object is to construct the guide along lines of simplicity in order that its cost may be reasonable.

With the above objects in view, a better understanding of the invention may be had by reference to the accompanying drawing, in which—

Fig. 1 is a top plan view of the guide, showing its application to a pipe of small diameter;

Fig. 2 is a similar view, showing the application of the guide to a pipe of large diameter;

Fig. 3 is a front elevation of the guide;

Fig. 4 is an end view from the right-hand side of Fig. 3;

Fig. 5 is an illustration of the pipe equipped with the guide in readiness to receive the first bend;

Fig. 6 is a similar view, showing the first bend made;

Fig. 7 is another view showing the pipe turned about and a second or offsetting bend made therein;

Fig. 8 is another view showing the end of a side bend made in the pipe; and

Fig. 9 is a fragmental side view of the showing in Fig. 8.

In accordance with the foregoing, specific reference to the drawing indicates the guide as a prism-shaped block 15 which is square in outline. The block is equipped in each of its marginal surfaces 16 with a sunken spirit level 17.

The block 15 has a rear extension 20 which is formed with a cross-slot 21 in which a blade 22 is slidable. A set screw 25 is threaded through the block from the front to engage the blade 22 and fix the same at any position in its sliding movement. One end portion of the blade 22 carries a C-clamp 27 having the usual bolt 28.

Fig. 1 shows that the guide is applied to one end of a pipe 30 by engaging the wall of the pipe in the clamp 27. The guide 15 is centered in reference to the pipe by sliding the guide close to the clamp as shown and tightening the screw 25. However, if the pipe is of a much larger size, as shown in Fig. 2, the guide 15 may be slid across along the blade 22 to the position shown in order to center it in relation to the pipe.

Whichever size of pipe is employed, the guide applied as described places the pipe in readiness for the bending operation. Fig. 5 shows a simple form of bending machine as represented by a ram 32 and outer jaws 33. With the ram operated in the direction indicated by the arrow, it is seen that the first bend 35 in the pipe is formed in accordance with Fig. 6. In order to form an offset in the pipe, the latter is turned and the pipe is again placed in the bending machine to form the second bend 40 according to Fig. 7. However, the positioning of the pipe is important in order to continue the second bend in the plane of the first bend, the guide being utilized for this purpose. Thus, assuming that the bending ram 32 operates in a horizontal plane, the first application of the guide is to set it with the spirit level in the top surface at center. It is now apparent that the setting of the pipe for the second bend will be accomplished only if the spirit level remains in or returns to the centered position.

With the offset made in a given plane, it may be necessary to bend the opposite end of the pipe at right angles to the plane of the offset. For this purpose, it is necessary only to set the pipe in the bending machine with the guide rotated one-quarter turn to present a spirit level at the top. When this level is centered, the pipe is set accurately for the side bend 45, as seen in Figs. 8 and 9.

It has been mentioned that the guide is slidable along the blade 22, presumably for placing it in balanced opposition to the end of the pipe. However, this condition is not essential, and the guide may be made in a modified form together with the clamp and retain its alining efficiency while costing less to produce.

It will now be apparent that the novel guide forms a handy and highly accurate adjunct preparatory to a pipe bending operation. It is inadvisable, even for those who are skilled in the pipe bending art, to rely on guesswork or visual alinement in the making of offsets or turns, since even a slight error at the origin of a bend or turn creates a wide departure or angle from the proper plane at a distant point. The novel guide therefore provides an accurate alinement in either a given plane or one at right angles to it because of the squared form of the guide and the accurate centering afforded by its spirit levels. With these occurring on all four sides, one is always available or in view when the work is to be set for bending. While the sliding of the guide along the clamp blade may balance it in reference to the pipe according to the diametrical size of the latter, it is not essential that the guide be slidable, since, according to the modification, it may be built in one piece with the clamp and still serve its purpose; and it would entail a lesser manufacturing cost in the modified form.

While I have described the invention and its modification along specific lines, various minor changes or refinements may be made therein without departing from its principle, and I reserve the right to employ all such changes and refinements as may come within the scope and spirit of the appended claims.

I claim:

1. An aligning guide for use on a pipe to be bent comprising an elongated blade member, a U-shaped clamp having inner and outer legs and a bight portion, said bight portion rigidly secured to said blade at one end thereof, said inner leg adapted to be positioned within an open end of the pipe, a bolt extending transversely through said outer leg to hold said pipe in engagement with said inner leg, a square block having marginal faces thereon mounted on said blade on the side opposite said U-shaped clamp and in a plane parallel to the plane of the open end of said pipe, and a spirit level mounted in each marginal face of said block.

2. The structure of claim 1, wherein said block is selectively positioned along said blade, and adjustable means securing said block to said blade.

References Cited in the file of this patent

UNITED STATES PATENTS

| 278,116 | Fisher | May 22, 1883 |
| 625,019 | Cardell | May 16, 1899 |
| 937,480 | Smith et al. | Oct. 19, 1909 |
| 1,422,231 | Stanley | July 11, 1922 |
| 2,531,563 | Feldheim | Nov. 28, 1950 |

FOREIGN PATENTS

| 2,559 | Great Britain | Nov. 17, 1801 |
| 4,824 | Great Britain | Mar. 11, 1892 |